Figure 1:
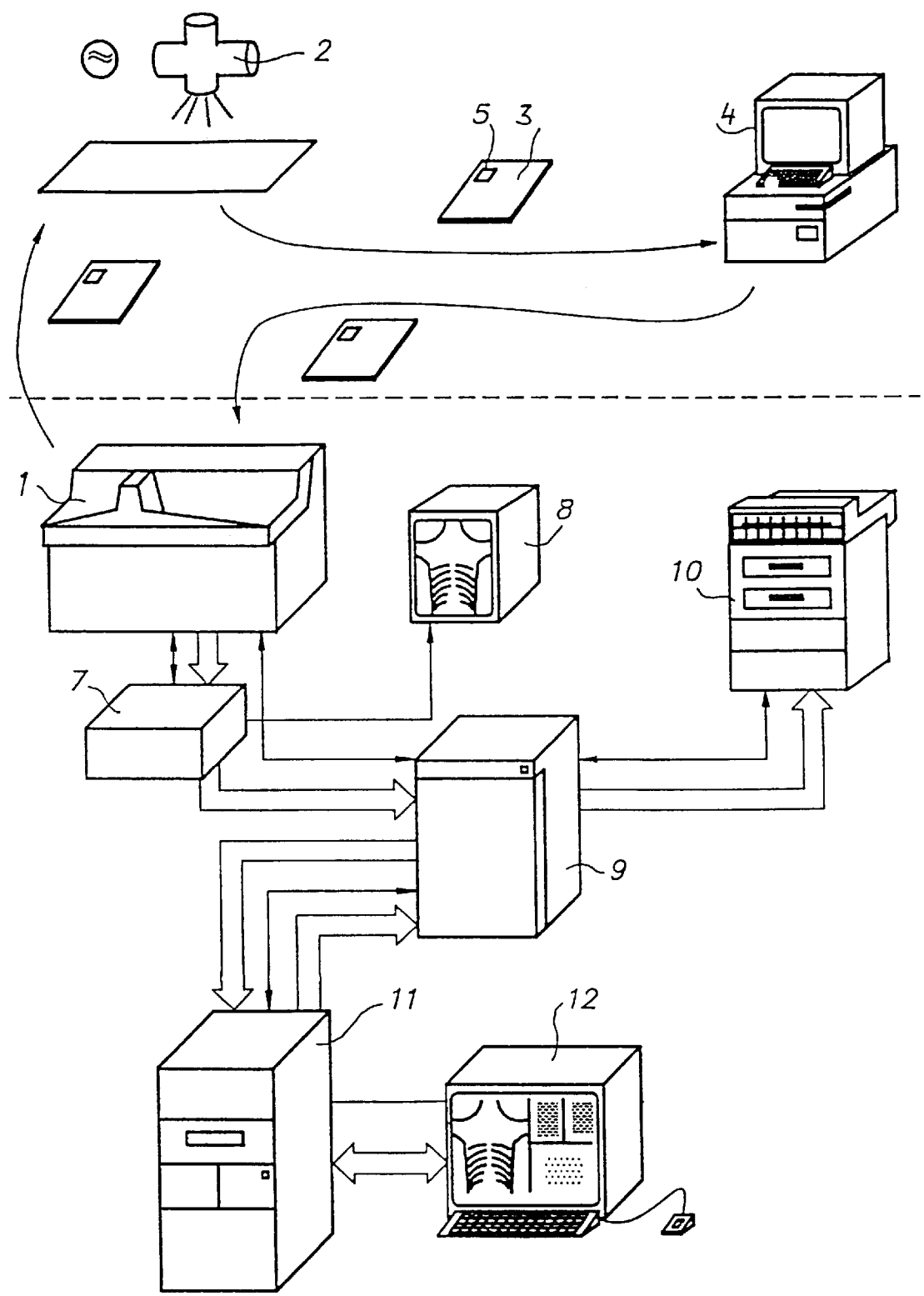

United States Patent [19]
Jacobs

[11] Patent Number: 5,812,276
[45] Date of Patent: Sep. 22, 1998

[54] REPRODUCTION OF MEDICAL IMAGE ON WEB-LIKE REPRODUCING MATERIAL

[75] Inventor: Walter Jacobs, Blaasveld, Belgium

[73] Assignee: Agfa-Gevaert, Mortsel, Belgium

[21] Appl. No.: 720,294

[22] Filed: Sep. 26, 1996

Related U.S. Application Data

[60] Provisional application No. 60/008,590 Dec. 13, 1995.

[30] Foreign Application Priority Data

Oct. 9, 1995 [EP] European Pat. Off. ............. 95202702

[51] Int. Cl.$^6$ ............................. H04N 1/32; H04N 1/31; G01D 15/24; B41F 13/56
[52] U.S. Cl. ......................... 358/302; 358/304; 358/438; 358/449; 347/262; 346/136; 101/224
[58] Field of Search ...................... 358/296, 302, 358/304, 401, 434, 438, 448, 449, 451, 501, 530; 346/134, 135.1, 136; 347/153, 218, 221, 262, 264; 128/920, 922; 382/128, 132; 101/219, 224, 226, 227; 400/621, 621.1, 621.2, 578, 582

[56] References Cited

U.S. PATENT DOCUMENTS

| | | |
|---|---|---|
| 3,585,289 | 6/1971 | Huber et al. ......................... 346/24 X |
| 4,442,460 | 4/1984 | Kurata et al. .......................... 358/296 |
| 4,686,541 | 8/1987 | Rosier .................................... 347/262 |
| 4,818,024 | 4/1989 | Michel ...................................... 298/27 |
| 4,864,410 | 9/1989 | Andrews et al. .................. 358/302 X |
| 5,072,306 | 12/1991 | Matsumoto et al. .............. 358/304 X |
| 5,229,827 | 7/1993 | Sato et al. .......................... 358/304 X |
| 5,257,114 | 10/1993 | Yoshida et al. ....................... 358/448 |
| 5,325,117 | 6/1994 | Huh et al. ........................ 358/296 X |
| 5,452,632 | 9/1995 | Dürr et al. ................................. 83/13 |
| 5,530,468 | 6/1996 | Yoshimi et al. ....................... 347/262 |

FOREIGN PATENT DOCUMENTS

| | | |
|---|---|---|
| 503702A1 | 2/1992 | European Pat. Off. . |
| 0481694 | 4/1992 | European Pat. Off. ......... H04N 1/00 |

OTHER PUBLICATIONS

Philips Telecommunication Review, vol. 49, No. 4, Dec. 1, 1991; pp. 4–11, XP 000278828; Hertlein et al.; "Medikon—A Medical Conference Facility with Transmission of Digital Images".

*Primary Examiner*—Eric Frahm
*Attorney, Agent, or Firm*—Baker & Botts, L.L.P.

[57] ABSTRACT

In reproducing medical images which are supplied in digital form and which vary in size, a web-like reproducing material is used. The reproducing material is cut at variable lengths in correspondence with the sizes of the images.

9 Claims, 3 Drawing Sheets

REPRODUCTION OF MEDICAL IMAGE ON WEB-LIKE REPRODUCING MATERIAL

The application claims the benefit of the U.S. Provisional Application No. 60/008,590, filed Oct. 9, 1995

1. FIELD OF THE INVENTION

The present invention is in the field of digital radiography. The invention relates in particular to hard copy recording of medical images provided in the form of a digital image representation.

2. DESCRIPTION OF THE STATE OF THE ART

In the field of digital radiography a wide variety of image acquisition techniques have been developed that render a digital representation of a medical image.

Among such techniques are computerised tomography, nuclear magnetic resonance, ultrasound detection, detection of a radiation image by means of an image intensifier, CCD sensor or a video camera, radiographic film scanning etc.

In another technique a medical image, for example an X-ray image of an object, is stored in a screen comprising a photostimulable phosphor such as one of the phosphors described in European patent application 503 702 published on 16.09.92.

In a read out station the stored radiation image is read by line-wise scanning the screen with stimulating radiation such as laser light of the appropriate wavelength, detecting the light emitted upon stimulation and converting the emitted light into a digital signal representation that can be subjected to different kinds of image processing techniques.

After read-out the residual image left on the photostimulable phosphor screen is erased so that the screen is again available for exposure.

The original digital signal representation of the image acquired by one of the above acquisition techniques or the processed digital signal representation of the image can then be applied to a hard copy recorder for reproduction of the image on a hard copy material such as photographic film.

Conventionally hard copy recorders record a hard copy image on recording material provided in sheet format.

For example, the photographic film recorders available on the market nowadays, are equipped with a number of dispenser magazines comprising different sheet formats. Typically these printers feature two film formats on-line.

For example Agfa's MATRIX LR 3300 is a laser recorder that can handle 4 different film sizes: 20.3 cm×25.4 cm (8 inch×10 inch), 27.9 cm×36.5 cm (11 inch×14 inch), 36.5 cm×36.5 cm (14 inch×14 inch) and 35.6 cm×43.2 cm (14 inch×17 inch). This laser recorder allows the simultaneous availability of two film formats during operation.

The size of the recording material can then be selected from the sheet formats made available by the recorder. The image formats and image lay out used in such recorders are freely programmable. They can be adapted to the operator's choice.

Depending on the original (digital) image size (pixel matrix) selected film size and image format as well as the memory capacity in the recording unit, the images are rescaled to fit in the selected format.

Most conveniently, the radiologist's regarding image layout are pre-programmed and stored.

From the viewpoint of optimal use of the film area, for each aspect ratio of the medical images, a film format should be available that has the same aspect ratio.

However, as described hereinabove, the number of film formats is limited so that in some cases the film will not be optimally occupied by the recorded image. Consequentially there is a waste of unused recording material.

For example, when an image that has been stored in a 18 cm×43 cm format photostimulable phosphor conveying cassette, is to be reproduced by means of a hard copy recorder provided with two on-line film formats, for example 20.3 cm×25.4 cm (8 inch×10 inch) and 35.6 cm×43.2 cm (14 inch×17 inch), there is no film format with the same aspect ratio as that of the image and hence a best choice must be made between the available film formats. Consequentially the film will not be optimally filled.

3. OBJECTS OF THE INVENTION

It is an object of the present invention to provide a system for reproducing a medical image provided by a digital signal representation wherein the consumption of recording material is decreased.

It is a further object of the present invention to provide such a system wherein the recording material is optimally filled with image information in cases where medical images of a wide variety of formats are reproduced.

Still further objects will become apparent from the description hereinbelow.

4. STATEMENT OF THE INVENTION

The above objects are achieved by a method of reproducing on a reproducing material medical images of various sizes, that are provided in the form of a digital signal representation, characterised in that (i) said medical images are reproduced on a reproducing material that is provided in the form of a web; and (ii) said web is cut at variable lengths that correspond with the sizes of the reproduced images.

Another aspect of this invention relates to a system for reproducing on a reproducing material medical images of various sizes, provided in the form of a digital signal representation, characterised in that means are provided to accommodate said reproducing material in the form of a web, and means are provided for cutting said reproducing material at variable lengths that corresponds with the sizes of the reproduced images.

The present invention is applicable to the reproduction of all kinds of medical images acquired by various kinds of image acquisition apparatus.

The system is however especially designed for application in the field of digital radiography based on photostimulable phosphor technology such as that which has been described hereinabove.

In such a system a great variety of formats of photostimulable phosphor screens are used. The selected format depends on the type of examination that is performed.

After read out, images of different formats are sent to a recorder that, as described hereinabove, commonly features only two or three different formats of recording material. So, non-optimal filling of the reproducing material is frequently encountered when conventional hard-copy recorders are used in this specific field of application.

The specific procedure followed in a system wherein radiographic images are recorded on photostimulable phosphor screens is described hereinbelow with reference to the drawings.

Basically, the length of the web-like recording material that will be cut is determined for each format of cassette conveying a photostimulable phosphor screen. This length is stored in advance in a data base or in a look up table. It is retrieved at the moment of read out of the image.

The data regarding the length of the recording material then accompany the read out image data to the recorder. There they are interpreted by the recorder and used to control the operation of cutting means.

Alternatively the data regarding the length of recording material to be cut is stored for each cassette type in the recorder itself and data concerning the cassette type accompany the read out image data sent to the recorder.

The inventors ran an experiment wherein different radiologists had to evaluate a number of reproduction formats for different types of examinations. They were asked to indicate the minimal acceptable dimensions of each image.

It was concluded that the width of the images had to be situated within the range of 17 cm to 30 cm.

An optimal width of the reproducing material was found to be 22.9 cm (9 inch).

However, a photographic material having a width of 22.9 cm (9 inch) is not among commercially available photographic materials at the present time. The closest width commercially available being 25.4 cm (10 inch) is thus selected.

5. BRIEF DESCRIPTION OF THE DRAWINGS

Figure 2:
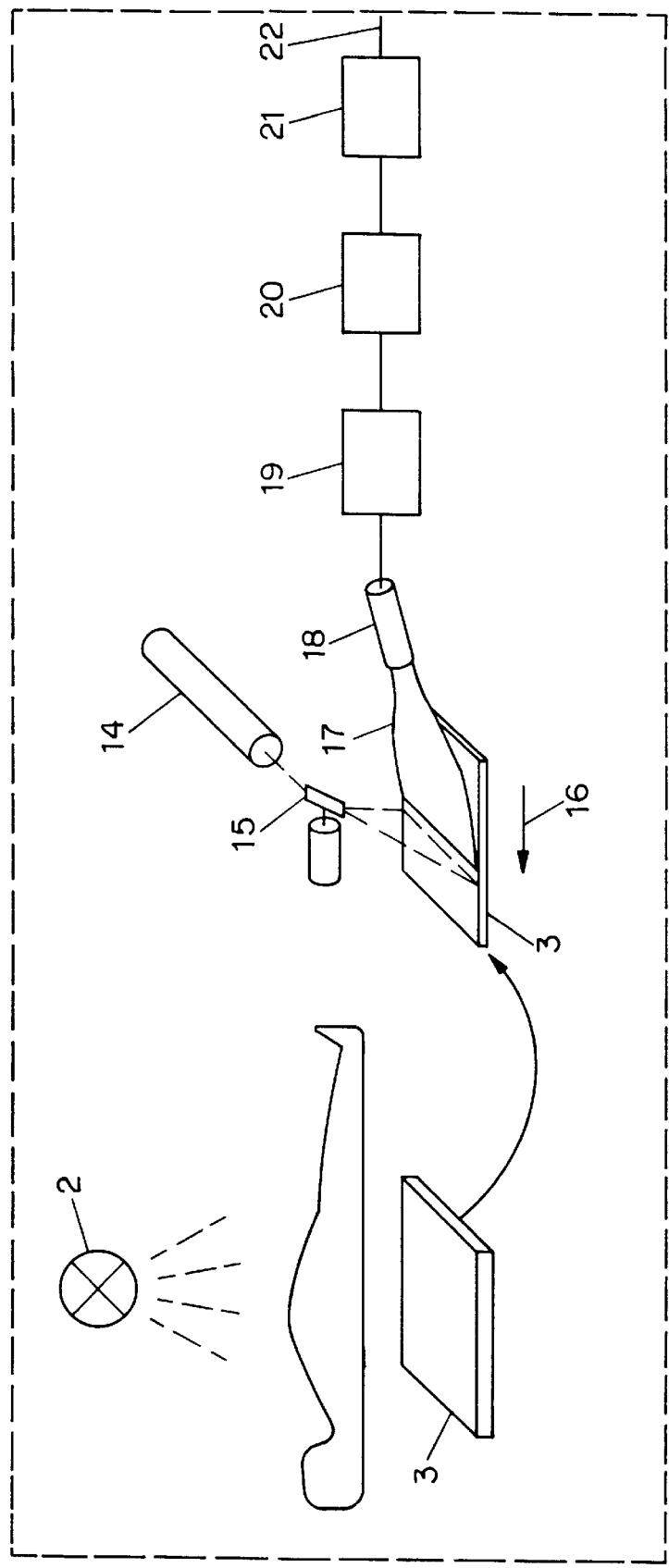
Figure 3:
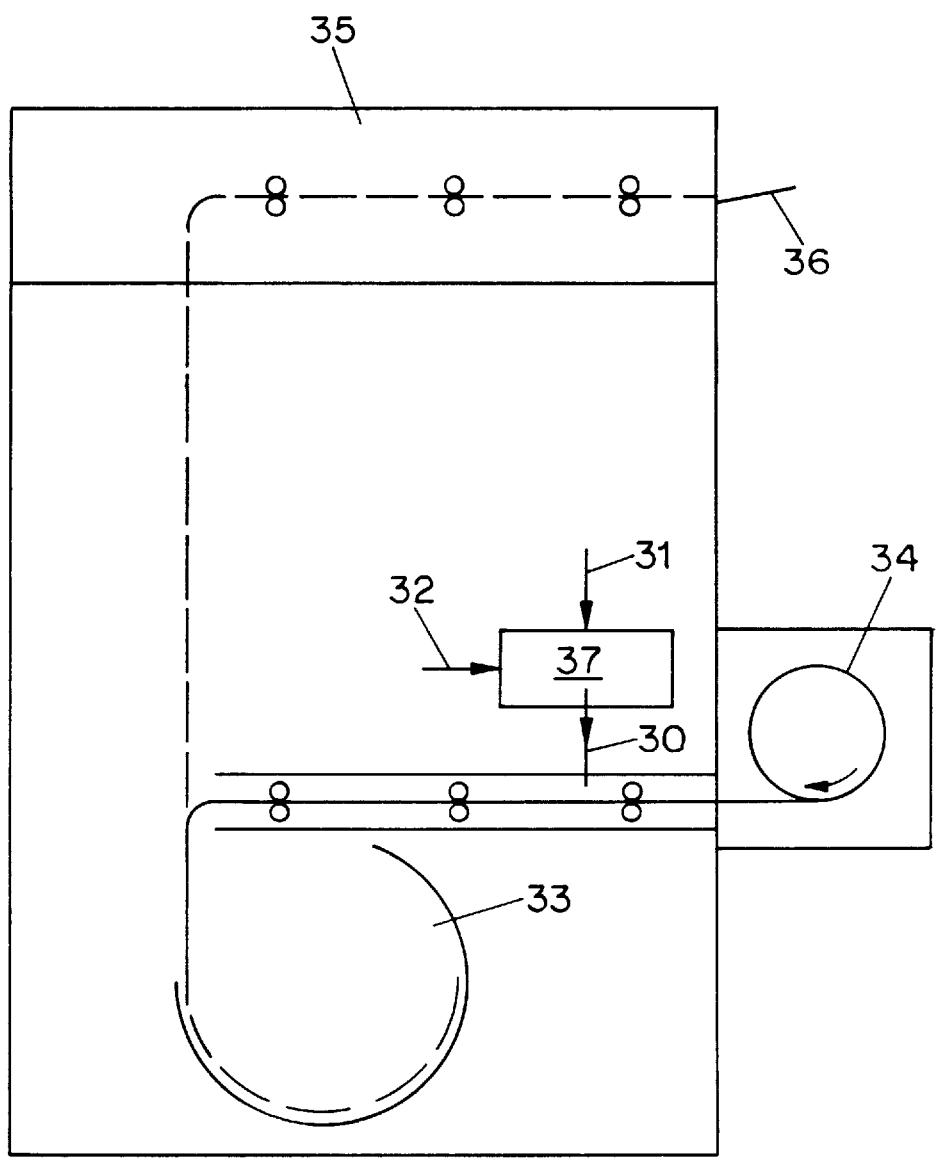

Particular aspects of the present invention as well as preferred embodiments thereof will be illustrated by means of the following drawings in which FIG. 1 is a general view of a system in which the method of the present invention can be applied, FIG. 2 shows an apparatus for reading an image stored in a photostimulable phosphor screen, and FIG. 3 shows a reproducing system adapted for use in a system according to the present invention.

6. DETAILED DESCRIPTION OF THE DRAWINGS

The present invention will be explained hereinbelow with reference to the reproduction of a radiographic image that has been stored in an intermediate storage medium, more specifically in a photostimulable phosphor screen.

A system wherein the method of the present invention can be applied basically comprises an apparatus (1) for acquiring a digital signal representation of an image, in this described case through the intermediary of a photostimulable phosphor screen; and a reproducing station (10) for reproducing the medical image.

An identification station (4) is provided for identifying an image and, since in most applications the digital signal representation of the medical image is subjected to signal processing, a signal processing station (7) is also shown.

An X-ray image of a patient was recorded on a photostimulable phosphor screen by exposing said screen to X-rays emitted by an X-ray source (2) and transmitted through the patient (not shown).

The stimulable phosphor screen was conveyed in a cassette (3) provided with an electrically erasable programmable read only memory (EEPROM) (5).

After exposure the cassette/screen combination was identified in an identification station (4). Here, patient demographics and examination type data were written onto the memory chip (5) provided on the cassette (3). Patient demographics are the patient's name, date of birth, sex etc. The examination type data are particularities on the performed type of examination.

The EEPROM further stores a number of invariable data among which is the cassette format.

Next, the cassette (3) was fed into a radiation image readout apparatus (1) where the information stored in the EEPROM and the image stored in the photostimulable phosphor screen were read-out.

The read out apparatus comprises storage means that are loaded in advance with a look up table comprising for each possible type of examination and related cassette format, parameters relating to the reading process such as adjustment parameters for the detector for detecting the image, parameters to be used during image processing, as well as parameters that relate to the hard copy output and archival functions. The parameters have been selected in advance, and are tailored to the needs and preferences of the radiologists.

The read-out procedure itself is illustrated in FIG. 2. The cassette conveying the screen was opened and the screen was taken out of the cassette and conveyed to a read out section.

The stored image was read-out by scanning the phosphor screen with stimulating rays emitted by a laser (14). The stimulating rays were deflected into the main scanning direction by galvanometric deflection means (15). The sub-scanning was performed by transporting the phosphor screen in the sub-scanning direction indicated by arrow (16). The stimulated emission was directed by means of a light collector (17) onto a photomultiplier (18) for conversion into an electrical signal representation.

The sensitivity of the photomultiplier was adjusted in accordance with the adjustment parameters that were stored in advance in the above look up table. The correct adjustment parameters were identified on the basis of the identification data of the image that was read out of the EEPROM on the cassette.

Next, the signal was amplified by square root amplifier (19), sampled by a sample and hold circuit (20), and converted into a 12 bit signal by means of an analog to digital convertor (21).

The digital raw image signal (22) was sent to the image processing module of the read-out apparatus (FIG. 1, numeral 7) where it was stored in an internal buffer.

The read-out signal was also applied to a preview monitor (8) for display immediately after read-out, thereby providing the operator with an early feed back in case anything went wrong.

In processing unit (7), image processing parameters were selected from the look-up table described hereinabove in accordance with the information read out of the EEPROM.

The digital image signal was subjected to a decomposition into detail images at multiple resolution levels and a residual image. These detail images and residual image were then transmitted from the image processor to an image workstation (not shown) via a digital communication channel where they were stored on hard disk.

On-line processing generally comprises a modification of the detail images which may serve various purposes followed by a reconstruction of a processed image by applying an inverse transform to the modified detail images and the residual image, the reconstruction process being such that when it would have been applied to the unmodified detail images and the residual image this would have resulted in the original unprocessed image or a close approximation thereof.

The read-out apparatus (1) including processing module (7) were further connected to a workstation (11) and associated review console (12) where off-line processing was performed. For the purpose of setting image processing parameters for the off-line processing and for determining the reproduction format, the data read from the EEPROM are transmitted together with the image to the workstation.

The look up table comprising processing parameters and data regarding the reproduction was also stored in advance in the workstation.

The image processing parameters and the data regarding the output format corresponding to the data read out from the EEPROM were retrieved from the look up table and applied for image processing and reproduction.

The read-out apparatus as well as the workstation were connected via a buffer (9) to an reproducing device (10).

FIG. 3 schematically shows a printer that is suitable for use in the context of the present invention.

The device comprises a supply cassette containing a roll (34) of reproducing material in web form. In this embodiment the reproducing material is photographic film. It further comprises cutting means (30) and means (37) for activating said cutting means in response of two control signals (31) and (32). Signal (31) indicates the length to be cut from the reproducing material and signal (32) is indicative of the length that is unwound from the supply roller (34). The reproducing device further comprises a recording section (33), that is of the internal drum type in the illustrated embodiment, and a processing section (35) where the photographic film material is developed. The operation of this recording device is as follows. Film is unwound from supply roller (34) and fed past un-activated cutting means (30). The cutting means are in a retracted position so that they do not have contact with the film. Cutting means (30) are activated by control means (37) once a length of reproducing material has been unwound that corresponds with the length represented by control signal (31), the length being measured by a measuring means (not shown) that generate a control signal (32) indicative of the unwound length.

Measuring means for measuring the length of recording material are sufficiently known in the art, for example a photodiode can be used to produce a signal during the period of time the reproducing material is transported past the diode. Knowing the velocity of the movement of the recording material past the diode, one can deduce from the known velocity and the measured time period the length that has been unwound and the cutting means can be activated once the unwound length corresponds with the predefined length to be cut.

Then, the film is transported to a recording section (33) where it is held in tight engagement with the inner surface of a drum, e.g. by means of clamps or vacuum attraction.

The film is scanned with a laser beam which is modulated in accordance with the signal representation of the image that is to be recorded.

Upon termination of the recording, the film is transported to a processing section (35) to be developed. The reproduced image then leaves the apparatus at output (36).

The described embodiment is a laser imager of the internal drum type that includes a developing station.

It will be clear that the type of reproducing device is irrelevant in the context of the present invention and that other types such as thermal printers, electrophotographic printers etc. as well as reproducing devices that do not incorporate a processing section fall within the scope of the present invention.

I claim:

1. A method of reproducing on a reproducing material medical images of various sizes, that are provided in the form of a digital signal representation, comprising the steps of:

reproducing said medical images on a reproducing material that is provided in the form of a web; and cutting said web at variable lengths that correspond with the sizes of the reproduced images, wherein said medical images are radiographic images that have been stored in a photostimulable phosphor screen, said photostimulable phosphor screen being conveyed in a cassette of a specific size, and wherein the digital signal representations of said images are obtained by scanning said screen with stimulating radiation, detecting the light emitted upon stimulation and converting detected light into digital signals, said lengths to be cut being retrieved from a database wherein a cassette size is linked with a length to be cut, and wherein said lengths are transmitted together with the digital signal representing a medical image to a reproducing device.

2. A method according to claim 1 wherein said web has a width within the range of 17 cm to 30 cm.

3. A method according to claim 1 wherein said reproducing material is a photographic film.

4. A method according to claim 1 wherein said reproducing material is a heat developable material.

5. A method of reproducing on a reproducing material medical images of various sizes, that are provided in the form of a digital signal representation, comprising the steps of:

reproducing said medical images on a reproducing material that is provided in the form of a web; and cutting said web at variable lengths that correspond with the sizes of the reproduced images, wherein said medical images are radiographic images that have been stored in a photostimulable phosphor screen, said photostimulable phosphor screen being conveyed in a cassette of a specific size, and wherein the digital signal representations of said images are obtained by scanning said screen with stimulating radiation, detecting the light emitted upon stimulation and converting detected light into digital signals, said specific size being transmitted together with the digital signal representing a medical image to a reproducing device where a length to be cut is retrieved from a database wherein a cassette size is linked with the length to be cut.

6. A system for reproducing on a reproducing material medical images of various sizes, provided in the form of a digital signal representation, comprising:

means for accommodating said reproducing material in the form of a web;

means for cutting said reproducing material at variable lengths that correspond with the size of the reproduced medical images; and means for storing a look up table wherein a number of formats of cassettes for conveying a photostimulable phosphor screen are linked with lengths of reproducing material.

7. A system according to claim 6 wherein said image is a radiographic image that has been stored in a photostimulable phosphor screen and the digital signal representation is provided by scanning said screen by means of stimulating radiation, detecting light emitted upon stimulation and converting detected light into a digital signal representation.

8. A system according to claim 6 wherein said reproducing material is a photographic film.

9. A system according to claim 6 wherein said reproducing material is a heat developable material.

* * * * *